Feb. 16, 1926.
S. G. LEWIS ET AL
SHOCK ABSORBER
Filed April 11, 1924  2 Sheets-Sheet 1
1,573,175
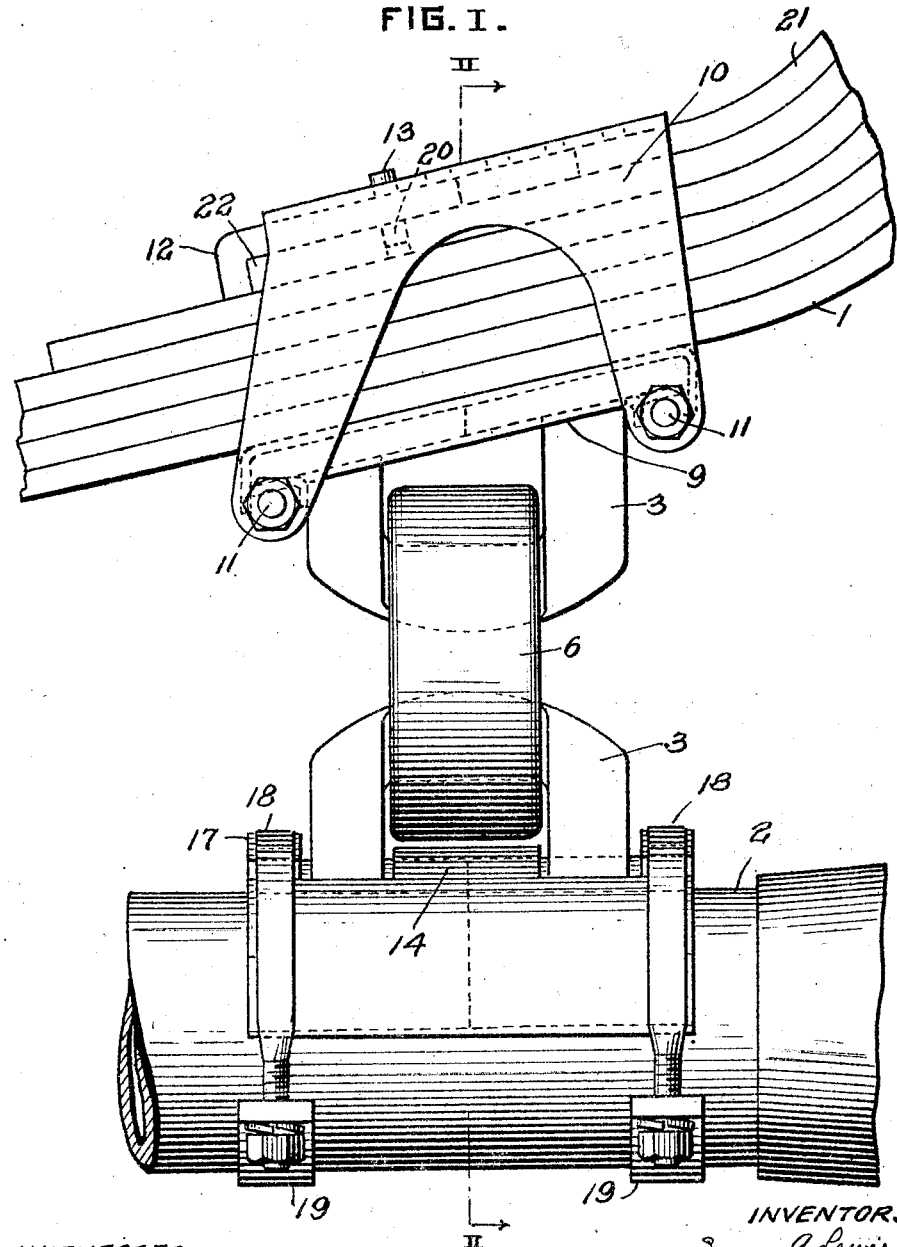

Feb. 16, 1926.  
S. G. LEWIS ET AL  
SHOCK ABSORBER  
Filed April 11, 1924
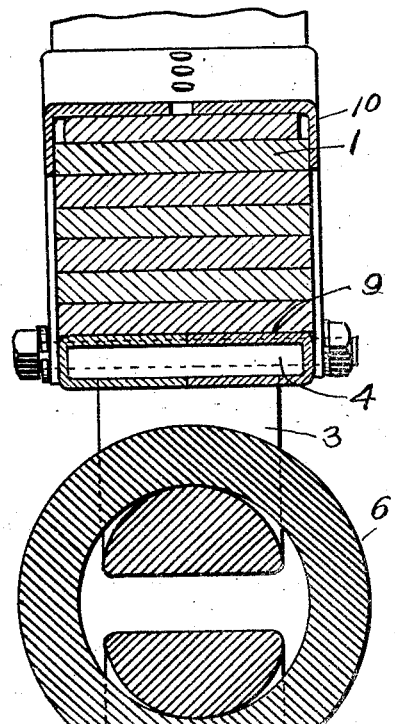
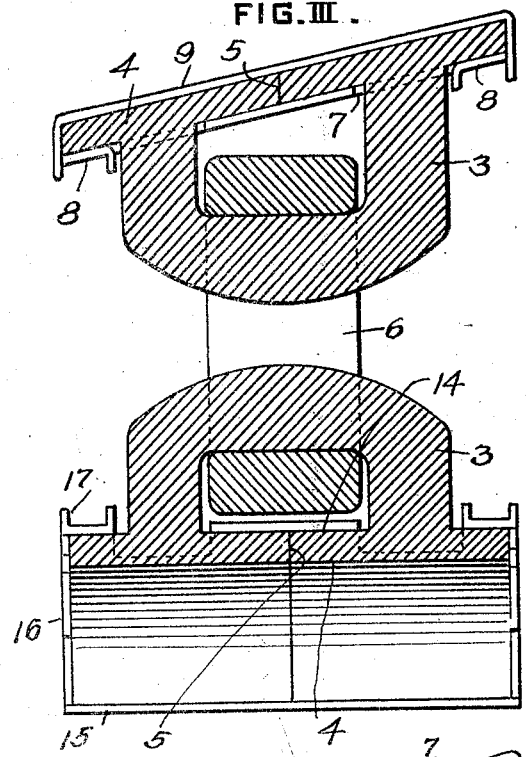
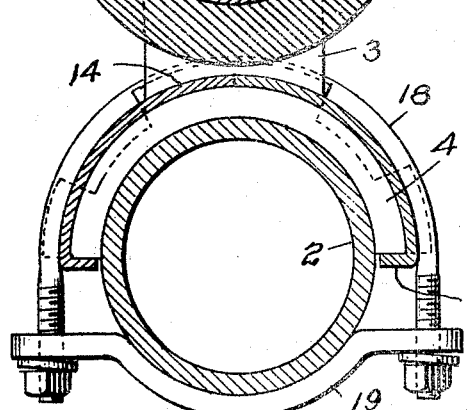
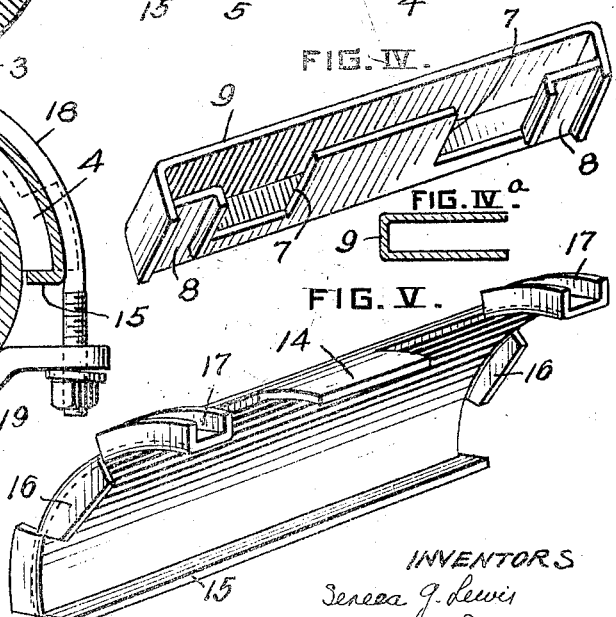
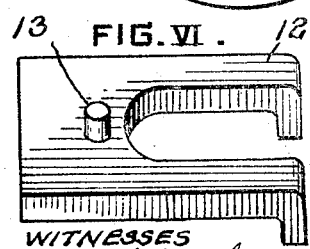

Patented Feb. 16, 1926.

1,573,175

UNITED STATES PATENT OFFICE.

SENECA G. LEWIS, OF GREENSBURG, AND GEORGE W. DAUM, OF JEANNETTE, PENNSYLVANIA.

SHOCK ABSORBER.

Application filed April 11, 1924. Serial No. 705,774.

*To all whom it may concern:*

Be it known that we, SENECA G. LEWIS and GEORGE W. DAUM, residing at Greensburg and Jeannette, respectively, in the county of Westmoreland and State of Pennsylvania, both citizens of the United States, have invented or discovered certain new and useful Improvements in Shock Absorbers, of which improvements the following is a specification.

In Letters Patent of the United States No. 1,468,881, granted us September 25, 1923, we have described and claimed a shock absorber intended primarily for use upon automobiles. The shock absorber includes two blocks of resilient material adapted to be secured, one to the axle, the other to the spring of an automobile, and linked one to the other by an elastic link.

Our present invention concerns improvements in such a shock absorber, improvements adapting it more perfectly to the particular application mentioned.

In the accompanying drawings Fig. I shows our shock absorber embodying the improvements which constitute our present invention; it shows in elevation a portion of the rear axle of an automobile, and a portion of the rear spring, assembled in proper space relation to the axle, and to this assembly our improved shock absorber is shown to be applied. Fig. II is a view in vertical section of the assembly of Fig. I. The plane of section is indicated by the dotted line II—II, Fig. I. Fig. III is a view of the shock absorber alone, shown in vertical section, and on a medial plane at right angles to that of Fig. II. Figs. IV and V show in perspective certain metal parts, by means of which our essentially rubber shock absorber is anchored to the parts between which the absorber functions. Fig. IVª is a view in cross-section or medial plane of the member shown in Fig. IV. Fig. VI is a view in perspective of a certain ancillary or auxiliary part.

As between the axle of an automobile and the leaf spring such as that illustrated in Figs. I and II, there is this difference,—that, whereas the axle is within itself substantially rigid, the spring is intended to be, and is, responsive to strain, and in consequence, it is, so long as motion continues, continually changing, not merely in its space relation to the axle, but in its angular position with respect to the axle, and, composed as it is of a plurality of leaves, these leaves are constantly shifting their positions relatively one to another. None of these movements is pronounced, but all of them obtain.

Our present invention is found in a structure of the same general nature as that shown and described in our prior patent mentioned above, but peculiarly adapted to the particular application, and particularly adapted to the inconstant character of the spring member to which, as has been made plain, one of its constituent parts is secured.

Referring first to Figs. I and II, the vehicle spring is indicated at 1, and as has been intimated, it is here shown in familiar form as a leaf spring. The axle of the vehicle is indicated at 2. The shock absorber consists essentially of a pair of co-operating compression members and a tension member. The compression members are blocks of suitable material, such as rubber; each consists of an arch or loop 3 of rubber, rising from a basal plate or foot 4. It will be understood that the basal plate and arch are molded as a single block of rubber. The basal plate is cleft medially as at 5, and on a vertical plane transverse to the arch 3, to afford access to the space formed by and between the basal plate or foot 4 and the arch 3. The basal plate or foot 4 of the upper compression block is essentially flat, and therein is adapted to be applied against the flat face of the spring 1. The basal plate or foot of the lower block is approximately semi-cylindrical, adapting it to be secured upon the cylindrical axle of the automobile. These plates are fully illustrated in the drawings.

The two compression members are set opposite one another, as the drawings show, and extend from their several supporting members into such proximity as to afford the desired cushioning or absorbing effect when the spring 1 is compressed.

The tension member is an endless band 6 formed preferably of elastic material, as of rubber. It extends beneath the arches of the two compression members and links the two members together, as is clearly shown in Figs. I, II, and III. This tension member by virtue of such elasticity as it may possess, added to the elasticity of the blocks 3—4, serves to cushion or absorb upward thrusts of the spring, in a direction away from the axle.

The arched openings in the compression members extend, when the parts are in place, transversely to the length of the axle. They are of considerable size, to allow proper play of the tension member 6 in performing its described function. The tension member 6, though not necessarily so formed, is preferably an integral, continuous, endless link, preferably, though not necessarily, of rubber. This tension member will ordinarily be made separately, and it is in order to permit of the assembly of the separately made parts that the basal plates or feet 4 of the compression members are cleft, as has already been described.

In certain respects the parts thus far enumerated will appear on comparison with the drawings to depart from the corresponding parts of the shock absorber of our prior patent. For instance, the openings through the compression blocks formed by the arches 3 are deeper vertically than in the earlier structure. Indeed, this distinction is indicated in that in this specification we speak of the parts 3 as arches. This minor difference in shape lends itself to a more secure and durable anchorage, presently to be described. In our prior patent we showed and described the opposing faces of the compression blocks to be cupped. This feature we have eliminated, and we show in this application these opposite faces to be round, and to be convex one to the other. In our prior patent we showed the tension member to be an oblong link. We here show it to be annular, and, as best shown in Fig. II, we show the bearing surfaces of the arches 3 to be curved on curves of a radius not exceeding, and preferably less than the radius of curvature of the inner surface of the annulus. Thus the annulus floats in its engagement with these opposite blocks.

It is, however, with the anchorage for the blocks that our present invention has primarily to do. We here show the basal plate or foot 4 of the upper block, that is to say, the block which is anchored to the spring 1 of the vehicle, to be wholly encased in metal, with openings only for the passage of the loop or arch 3. Comparison of Figs. III, IV, and IV$^a$ will show this casing for the basal plate or foot of the upper compression block to be made of two complementary and symmetrical parts meeting in a vertical midplane longitudinal with respect to the spring to which anchorage is to be effected. Each casing part is made of a single metal plate bent to shape. Openings 9 are formed for the passage through of the members of the arch 3. The edges of metal are bent to form at each end of this two-part casing a transversely extending channel 8.

The anchoring instrumentalities include a saddle-like member 10 formed of sheet metal, adapted to be applied to the body of the spring 1 from above, and when applied straddling the spring, its ends extending on either side downward beyond the body of the spring. Co-operating with this saddle-like member 10 are bolts 11, two in number, adapted to engage the downward-extending ends of the member 10, and by such engagement to effect complete encirclement of the body of the spring 1. These parts are so proportioned that, the compression member with its metal-encased base being first applied against the nether face of the body of the spring 1, when the saddle member 10 is applied and the bolts 11 added, the bolts 11 will extend longitudinally within the channels 8 already mentioned, and so the whole will be secured snugly in the relative positions shown in Figs. I and II.

A small hook 12, shown detached in Fig. VI, and shown in assembly in Fig. I, is adjustably secured from beneath to the midweb of the saddle member 10, as by means of a stud 13 protruding through one or another of a succession of holes formed for it in the web of the saddle member. This hook may further be provided with an oppositely extending stud 20, adapted to enter a hole drilled to receive it in the underlying leaf of the spring. The assembly is that shown in Fig. I. The saddle member 10 overlies the end of the uppermost leaf 21 of the spring and extends toward the end of the next lower leaf 22. The hook 12 engages the end of the leaf 22 and its opposite studs 13 and 20 enter holes provided for them in leaf 22 below, and in the web of the saddle-member 10 above. The web of the hook 12 is of substantially equal thickness with the leaf of the spring. Consideration of these matters with Fig. I in view, will make plain the facts in this matter. If in application the successive ends of the leaves of the spring be not suitably spaced to give the exact assembly shown in Fig. I, a filler plate with a stud anchored in a hole in the web of saddle member 10, may take the place of the end of the leaf 21, and so afford firm backing for the saddle member at the right-hand end of Fig. I.

Such anchorage, so particularly worked out, we find to be excellent in its results when it is effected upon the body of the spring 1, which, as has been explained, is in service constantly changing minutely in shape and position. By means of this anchorage durability in high degree of the essentially rubber structure is effected.

It is possible similarly to encase the semi-cylindrical basal plate or foot of the companion compression member, which is anchored to the axle of the automobile. We have shown that anchorage to the axle to be not so minutely refined. We have shown the basal plate or foot to be overlaid with a two-part plate 14 (shown in perspective in Fig. V) and we have shown the edges of the plate to be minutely shaped with flanges 15 and 16 to overlie the edges of the basal plate, and with other flanges forming the channel 17 in which arched clamping bolts 18 may lie, as is clearly shown in Figs. I and II.

In our earlier specification we have shown a clamping band encircling the axle and securing the lower compression member to it. We preferably employ the bars 19, to which the arched bolts 18 may be secured in yoke-like assembly, as shown in Fig. II.

It will be observed of the anchorage for both of the compression members that the metal plates with which they are faced, overlie not merely the broadly extending face of the foot, but, properly bent, overlie the edges also, thereby a rigidity of structure is afforded, the elasticity of the rubber is enjoyed to the full, and displacement such as might cause excessive wear is prevented.

The parts being assembled as shown in Figs. I and II, thrusts tending to collapse the spring are met and cushioned in the meeting of the blocks and the bearing of them one upon the other, while thrusts tending to expand the spring, are met and cushioned in the stretching of the substance of the blocks, particularly the arches 3, and of the substance of the tension member 6 (if it be elastic) as well.

We have described the tension member 6 as being elastic, and preferably it is; it will, however, be understood that our present invention is found particularly in the anchorage of the compression blocks, and that, therefore, it is capable of realization in a structure in which the tension member 6 itself may lack elasticity.

We claim as our invention:

1. A shock absorber for a vehicle including a block of elastic material, such block consisting of a basal plate and an arch springing therefrom, the basal plate being encased in metal and the metal case being provided externally and at opposite ends with bolt channels, a saddle-like member adapted to be applied to a vehicle spring with its ends protruding on either side beyond the body of the spring, and bolts adapted to extend between and to engage the ends of the saddle-like member, and when the parts are assembled to extend within the channels of said case.

2. A shock absorber for a vehicle including a block of elastic material, such block consisting of a basal plate and an arch springing therefrom, the basal plate being encased in metal and the metal case being provided externally and at opposite ends with bolt channels, a saddle-like member adapted to be applied to a vehicle spring with its ends protruding on either side beyond the body of the spring, and bolts adapted to extend between and to engage the ends of the saddle-like member, and when the parts are assembled to extend within the channels of said case, and means for securing the saddle-like member against longitudinal displacement upon said spring.

In testimony whereof we have hereunto set our hands.

SENECA G. LEWIS.
GEORGE W. DAUM.